(12) United States Patent
Polonsky et al.

(10) Patent No.: US 7,078,694 B2
(45) Date of Patent: Jul. 18, 2006

(54) SYSTEM AND METHOD FOR SPATIAL, TEMPORAL, ENERGY-RESOLVING DETECTION OF SINGLE PHOTONS

(75) Inventors: Stanislav V. Polonsky, Putnam Valley, NY (US); Roger H. Koch, Amawalk, NY (US); Moyra K. McManus, Peekskill, NY (US)

(73) Assignee: International Business Machines Corporation, Armonk, NY (US)

( * ) Notice: Subject to any disclaimer, the term of this patent is extended or adjusted under 35 U.S.C. 154(b) by 897 days.

(21) Appl. No.: 10/202,301

(22) Filed: Jul. 24, 2002

(65) Prior Publication Data

US 2004/0016883 A1      Jan. 29, 2004

(51) Int. Cl.
*H01L 27/18*        (2006.01)

(52) U.S. Cl. .................................................. 250/336.2

(58) Field of Classification Search ............. 250/336.2, 250/370.01
See application file for complete search history.

(56) References Cited

U.S. PATENT DOCUMENTS

| 6,384,663 B1 * | 5/2002 | Cova et al. ................. 327/514 |
| 6,812,464 B1 * | 11/2004 | Sobolewski et al. ..... 250/336.2 |
| 2002/0043625 A1 | 4/2002 | Shimizu et al. |

FOREIGN PATENT DOCUMENTS

DE     10136679 A1 *   2/2002

OTHER PUBLICATIONS

Sobolewski et al., "Detection efficiency of large-actie-area NbN single-photon superconducting detectors in the ultraviolet to near-infrared range", Jun. 24, 2002, Applied Physics Letters, vol. 80 No. 25, pp. 4687-4689.*
Gol'tsman et al., "Picosecond superconducting single-photon optical detector", Aug. 6, 2001, Applied Physics Letters, vol. 79 No. 6, pp. 705-707.*

* cited by examiner

*Primary Examiner*—David Porta
*Assistant Examiner*—David S. Baker
(74) *Attorney, Agent, or Firm*—F. Chau & Associates, LLC

(57) ABSTRACT

A system and method for providing spatial, temporal, energy-resolving detection of single photons using superconducting transmission lines.

26 Claims, 5 Drawing Sheets

SYSTEM AND METHOD FOR SPATIAL, TEMPORAL, ENERGY-RESOLVING DETECTION OF SINGLE PHOTONS

BACKGROUND OF THE INVENTION

1. Field of the Invention

The present invention relates to single photon detectors using superconducting transmission lines.

2. Discussion of Related Art

Single photon detectors are used in Picosecond Imaging Circuit Analysis ("PICA") for non-invasive diagnostics of semiconductors circuits. The photons emitted during the switching of Metal Oxide Semiconductor Field Effect Transistors ("MOSFET") are detected and the information about their arrival time and source locations is recorded by computer. This information can be used to reconstruct the switching activity of a circuit and to make conclusions about the circuit's operation.

In the current marketplace there are quite a few single photon detectors, such as Photomultiplier Tubes ("PMT"), Multichannel Plate Photomultipliers ("MCP"), and Single Photon Avalanche Photodiodes ("SPAD"). They differ based on characteristics such as quantum efficiency, counting rate, time resolution, dark counting rate, spectral sensitivity capability, and imaging capability (spatial resolution of a detected photon).

An ideal single photon detector would have high quantum efficiency, high counting rate, high time resolution, low dark counting rate, high spectral sensitivity, and high spatial resolution. None of the existing single photon detectors satisfy these criteria. For example, the MCP provides imaging capabilities but it is slow (hundreds of picoseconds). SPAD (tens of picoseconds) is faster than MCP but lacks the imaging capabilities of MCP. Therefore a need exists for a fast imaging single photon detector.

SUMMARY OF THE INVENTION

A system and method are provided for spatial, temporal, and energy-resolving detection of single photons comprising the steps of biasing D.C. current in a superconducting transmission line having a length L and an impedance Z. The superconducting transmission line is connected to a read-out circuit and a computer. A single photon having energy E hits the superconducting transmission line at location d from the center of transmission line causing two voltage pulses to propagate along the superconducting transmission line in different directions with speed v. The arrival time t1 and t2 of the two voltage pulses is measured by the read-out circuit. A plurality of pulse properties of the two voltage pulses can also be measured by the read-out circuit.

The computer calculates the photon arrival time t0 and the photon location d using the following formulae $t0=(t1+t2-L/v)/2$, $d=v*(t1-t2)/2$. The single photon energy E can be calculated from the pulse properties using a plurality of calibration curves.

DESCRIPTION OF THE DRAWINGS

Preferred embodiments of the present invention will be described below in more detail, with reference to the accompanying drawings.

DETAILED DESCRIPTION OF PREFERRED EMBODIMENTS

Figure 1:
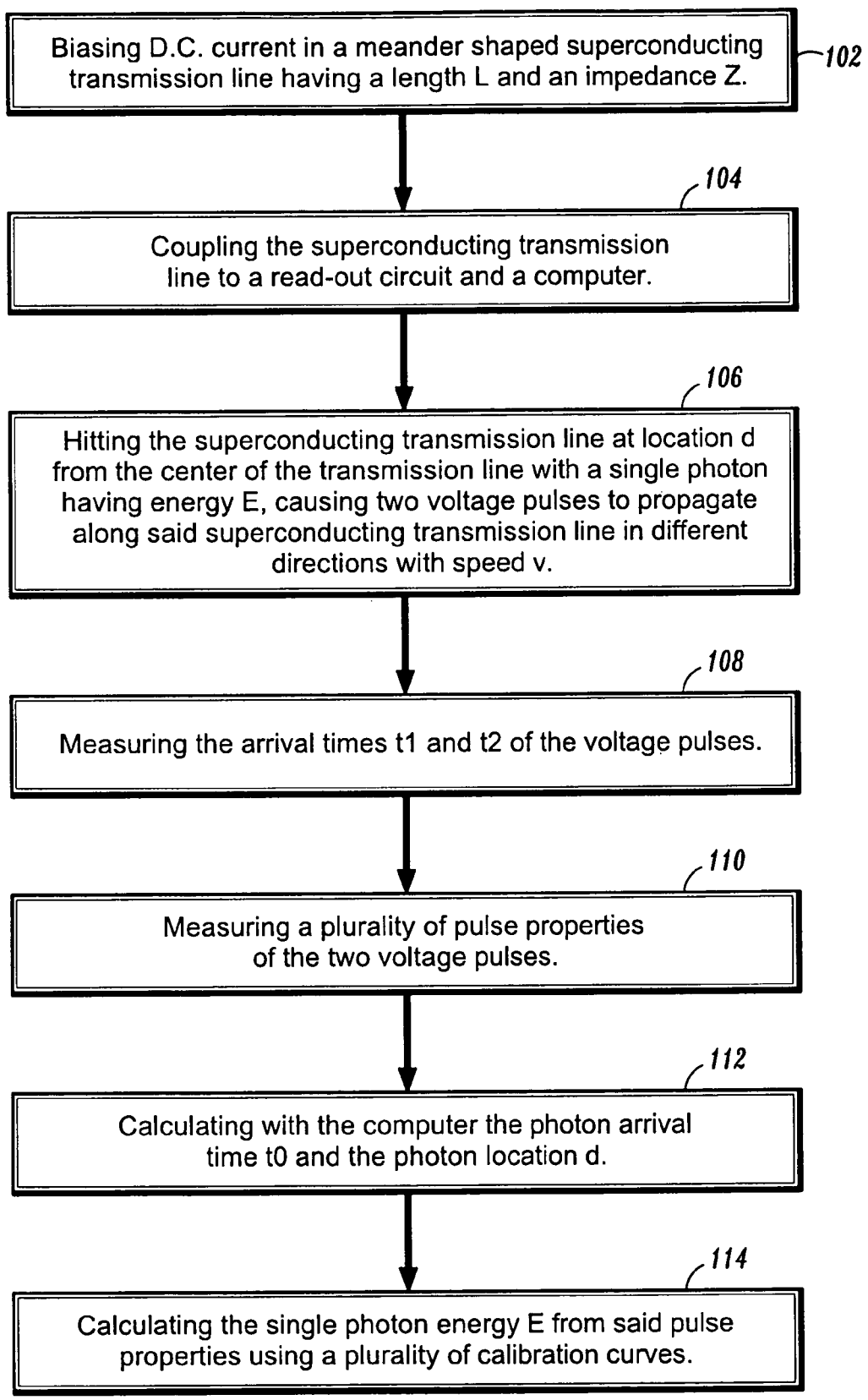
FIG. 1 is a flowchart of a method for spatial, temporal, energy-resolving detection of single photons.
Figure 2:
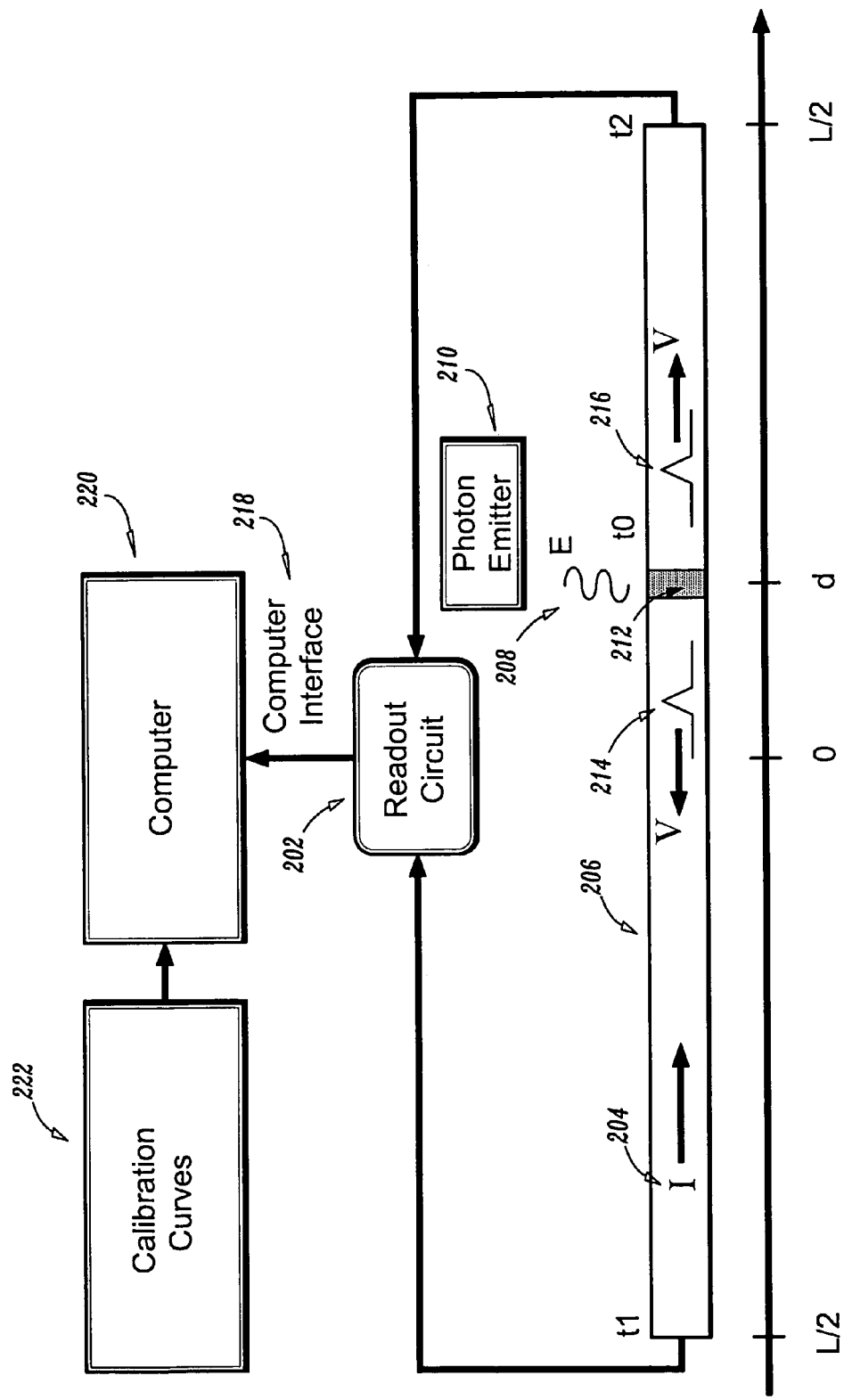
FIG. 2 is a side view illustration of a system to simultaneously measure the arrival time and the location of a photon using superconducting transmission line.
Figure 3:
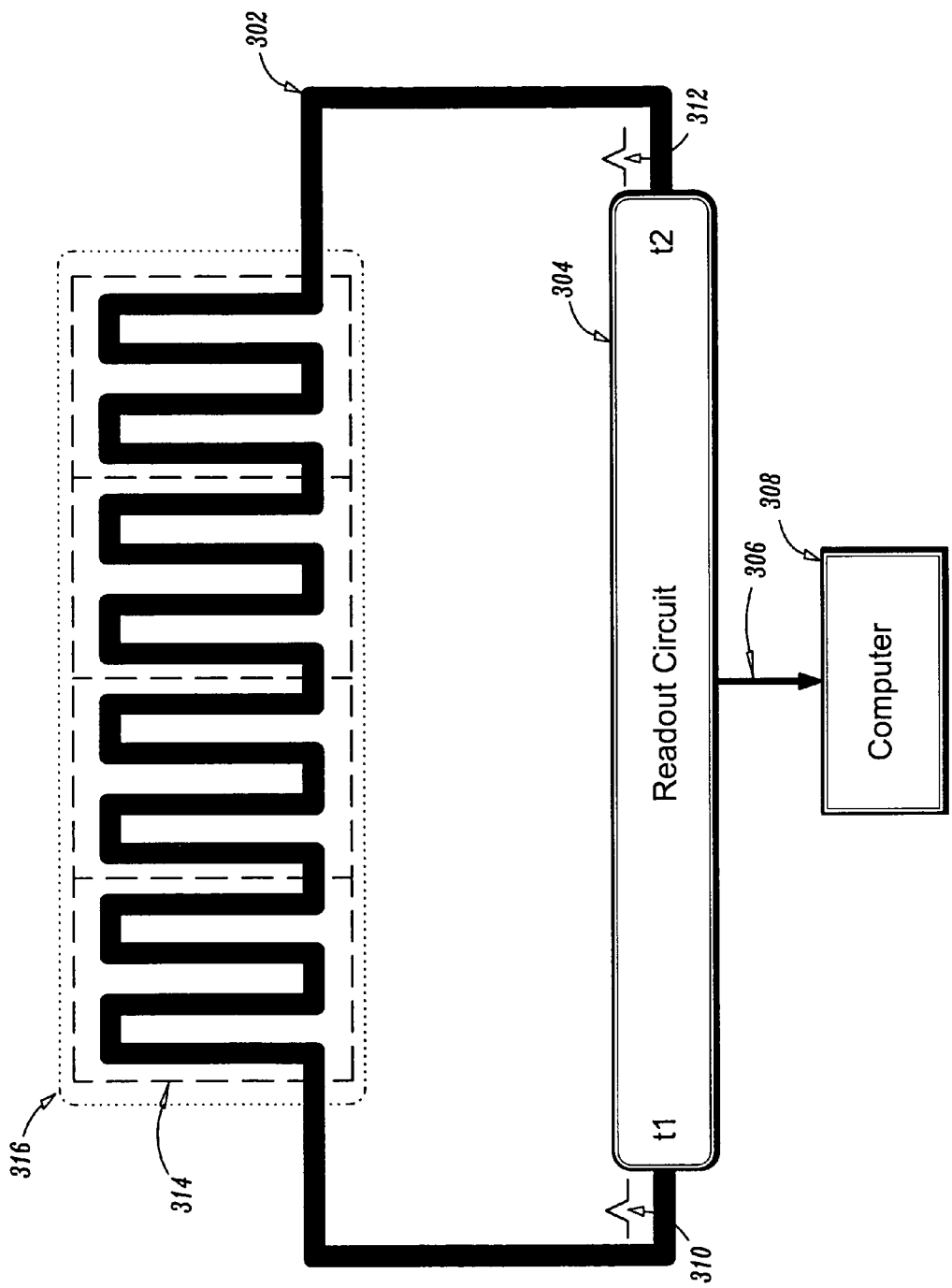
FIG. 3 is a top view of a one dimensional imaging detector.

Referring to FIGS. 1, 2, and 3, wherein FIG. 1 illustrates a method for spatial, temporal, energy-resolving detection of single photons, FIG. 2 is a side view illustration of a system for spatial, temporal, energy-resolving detection of single photons, and FIG. 3 is a top view illustration of a one dimensional imaging detector.

D.C. current 204 is biased (step 102) in a superconducting transmission line 206 having a length L and an impedance Z. A photon emitter 210 emits a single photon 208 having energy E that hits the superconducting transmission line 206 at location d from the center of said superconducting transmission line at arrival time t0, creating a temporary resistive region 212 having a characteristic resistance R. The measure of said impedance Z is comparable with said characteristic R, R having a value close enough to Z allowing voltage pulses 214, 216 to be detected by a read-out circuit 202 and to keep the amplitude of voltage pulses close to a maximum value I*R.

In an embodiment, said superconducting transmission line 302 is meander shaped. Said superconducting transmission line 302 is coupled to a read-out circuit 304. An output 306 of the read-out circuit 304 is coupled (step 104) to a computer 308.

A voltage drop is coupled (step 106) across a resistive region to said superconducting transmission line 206 in the form of two voltage pulses 214, 216 propagating along said superconducting transmission line 206 in different directions with speed v until said two voltage pulses 214, 216 arrive at opposite ends of said superconducting transmission line 206.

The read-out circuit 304 measures (step 108) the arrival times t1 and t2 of said voltage pulses 310, 312. In another embodiment of the invention, the read-out circuit 304 can measure (step 110) a plurality of pulse properties, for example, amplitude and duration, of said two voltage pulses 310, 312.

The computer 220 calculates (step 112) said photon 208 arrival time t0 and said photon 208 location d using the following formulae, $t0=(t1+t2-L/v)/2$, $d=v*(t1-t2)/2$. Said single photon 208 energy E is calculated (step 114) from said pulse properties using a plurality of calibration curves 222.

Additionally, FIG. 3 shows an embodiment of a one dimensional imaging detector having a meander shaped superconducting transmission line 302. The meander shaped transmission line 302 is logically divided into pixels 314. Preferably, in resolving times t1 and t2, the propagation delay within a single pixel equals the timing accuracy tp of the read-out circuit 304, where $tp=Lp/v$ and Lp is the length of the superconducting transmission line 302 within one pixel.

Implementing an on-chip integrated read-out circuit using known Rapid Single Flux Quantum ("RSFQ") logic or the like, is preferable. The maximum number of pixels Np is determined by the attenuation of pulses in the superconducting transmission line 302, $Np=La/Lp$, where La is the maximum distance the pulse can travel while still being detectable by the read-out circuit 304.

The superconducting transmission line 302 can be implemented as a microstrip transmission line assuming the presence of a superconducting ground plane 316, as shown in FIG. 3. The superconducting transmission line 302 can also be a coplanar waveguide or any other superconducting transmission line configuration. It can use external elements such as lumped or distributed parallel capacitors to control impedance Z and signal propagation speed v.

Figure 4:
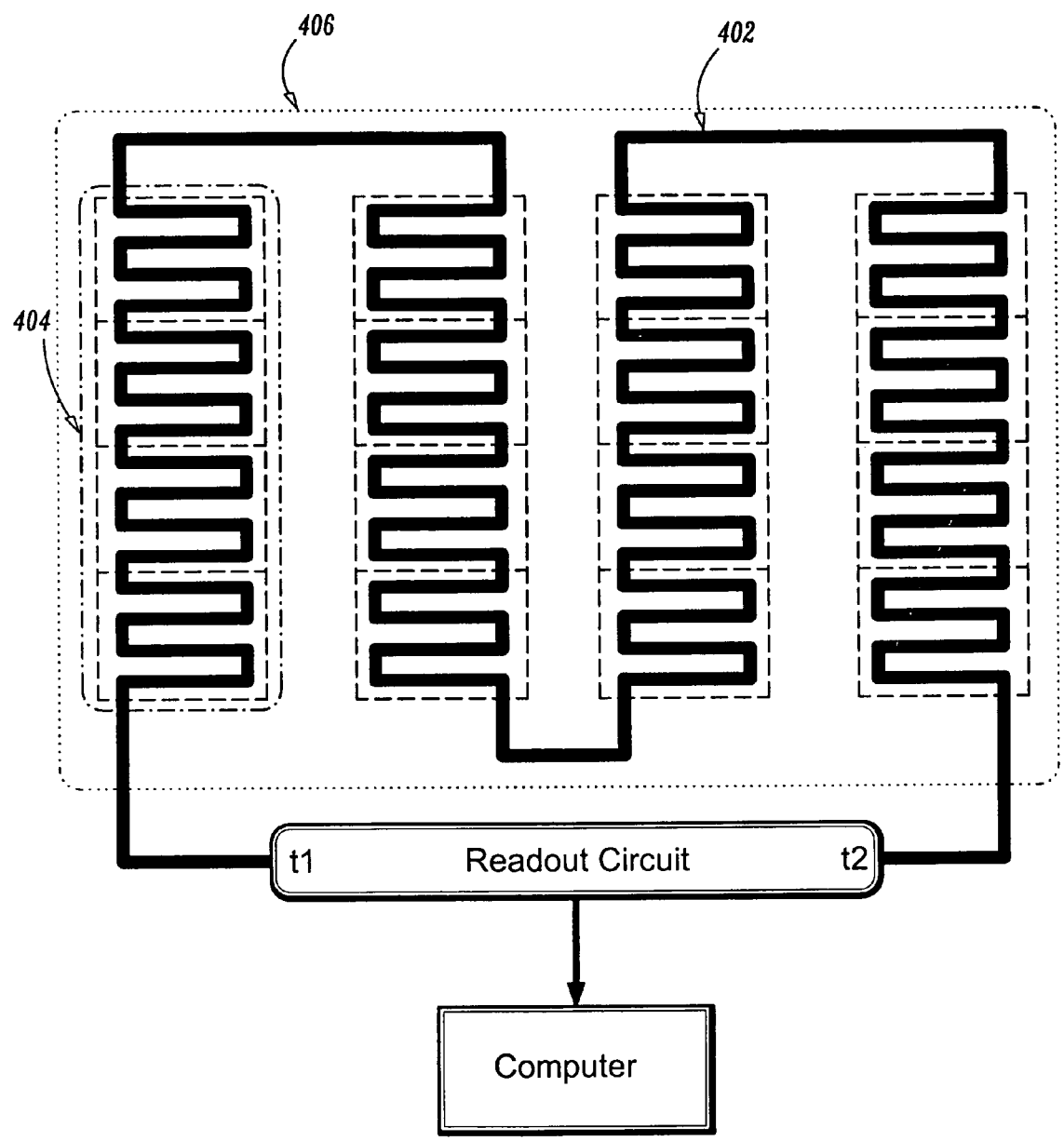
FIG. 4 is a top view of a two dimensional imaging detector.

FIG. 4 shows an embodiment of a two dimensional imaging detector having a double meander shaped superconducting transmission line 402. The primary meander structure 404 defines columns of pixels. The secondary meander structure 406 defines the rows of pixels. The same considerations regarding the minimum pixel length Lp and the maximum number of pixels Np apply to the two dimensional imaging detector.

Figure 5:
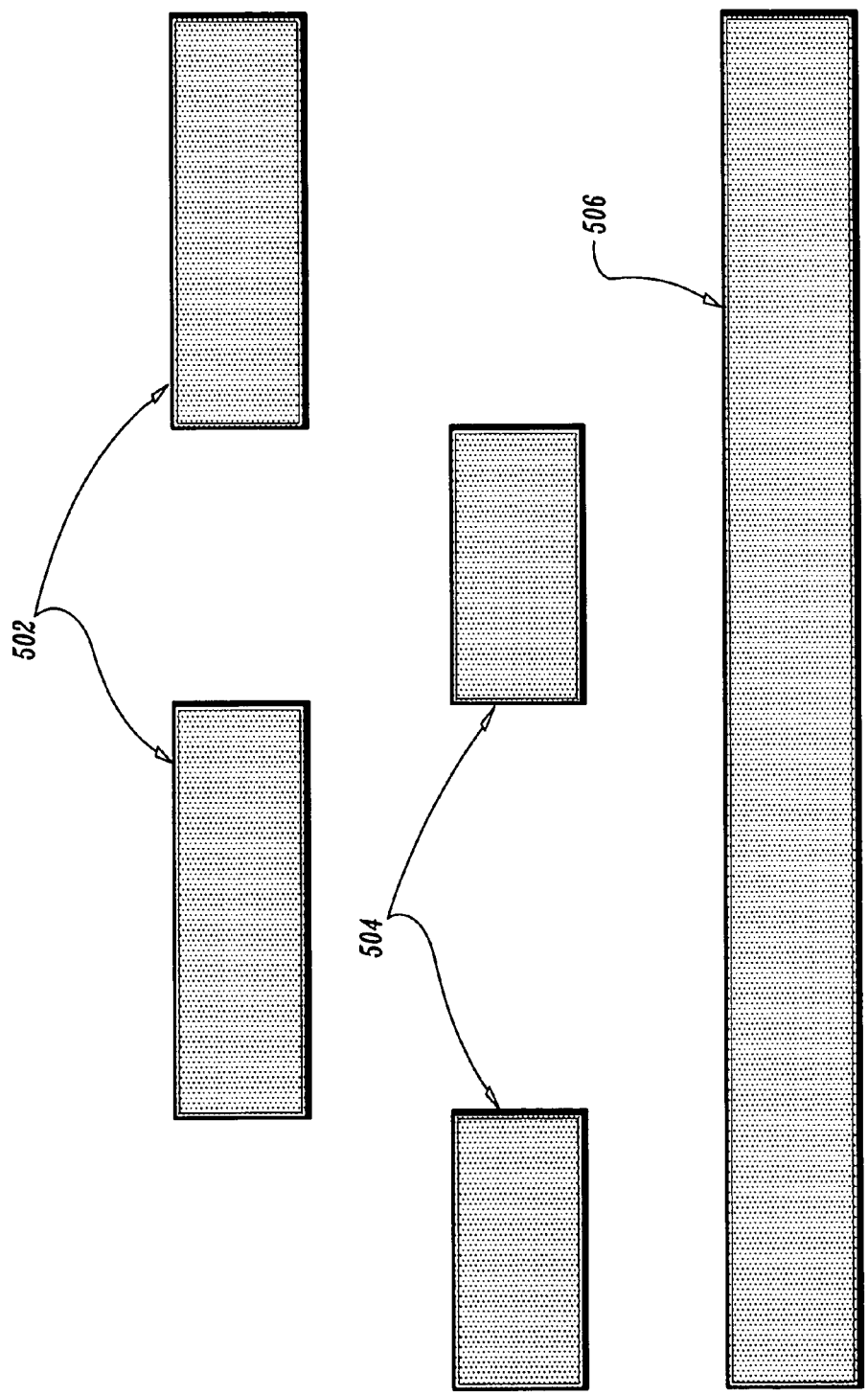
FIG. 5 is a cross-section view of an efficient imaging detector.

FIG. 5 is a cross-section view of an efficient imaging detector. Quantum efficiency of the detector increases with the increase of the area covered by the transmission line. Two superconductive detector strips 502 (top), 504 (bottom) over a superconducting ground plane 506 form two microstrip transmission lines that are arranged in a checkerboard fashion thus achieving 100% coverage of the detector area.

The vertical distance between superconducting microstrip layers can be chosen to minimize reflections for a given frequency range. Preferably, both microstrip lines 502, 504 are connected in series for each pixel. Other types of connections are possible. For example, these two microstrip lines can run in parallel throughout the whole detector and even have separate read-out circuits. Also, there can be more than two microstrip lines.

It is to be understood that many other approaches can be taken to implement an imaging detector. For example, a pixel can have a spiral shape. Moreover, a superconducting transmission line can have a spiral shape if radial pixel arrangements are required.

Having described embodiments for providing spatial, temporal, energy-resolving detection of single photon, it is noted that modifications and variations can be made by persons skilled in the art in light of the above teachings. It is therefore to be understood that changes may be made in the particular embodiments of the invention disclosed which are within the scope and spirit of the invention as defined by the appended claims.

What is claimed is:

1. A method for providing spatial, temporal, energy-resolving detection of single photons comprising the steps of:
   biasing D.C. current I in a superconducting transmission line having a length L and an impedance Z;
   coupling said superconducting transmission line to a read-out circuit and a computer;
   hitting said superconducting transmission line at a location d from the center of said transmission line with a single photon having energy E causing two voltage pulses to propagate along said superconducting transmission line in different directions with speed v;
   measuring the arrival times t1 and t2, respectively, of said two voltage pulses; and
   calculating with said computer a photon arrival time t0 and said photon location d based on t1 and t2.

2. The method of claim 1, further comprising the step of said computer calculating said photon arrival time t0 and said photon location d using the formulae, $t0=(t1+t2-L/v)/2$, $d=v*(t1-t2)/2$.

3. The method of claim 1, wherein said superconducting transmission line is meander shaped.

4. The method of claim 1, further comprising the step of measuring a plurality of pulse properties of said two voltage pulses.

5. The method of claim 4, further comprising the step of calculating said single photon energy E based on said plurality of pulse properties.

6. The method of claim 1, further comprising the step of dividing said superconducting transmission line into a plurality of pixels.

7. The method of claim 6, wherein said plurality of pixels include spiral shaped pixels.

8. The method of claim 6, further comprising the step of determining the maximum number of pixels Np, $Np=La/Lp$ where La is the maximum distance a pulse can travel and Lp is the length of said superconducting transmission line within one pixel.

9. The method of claim 1, further comprising the step of implementing Rapid Single Flux Quantum logic in an on-chip integrated read-out circuit.

10. The method of claim 1, wherein said superconducting transmission line includes a double meander shaped transmission line having a primary meander structure that defines columns of a first plurality of pixels and a secondary meander structure that defines rows of a second plurality of pixels.

11. The method of claim 1, wherein said superconducting transmission line includes a microstrip transmission line having a superconducting ground plane.

12. The method of claim 1, wherein said superconducting transmission line includes a coplanar waveguide transmission line.

13. The method of claim 1, wherein said superconducting transmission line comprises a plurality of superconductive strips over a superconducting ground plane to form two microstrip transmission lines arranged in a checkerboard fashion.

14. A system for providing spatial, temporal, energy-resolving detection of single photons comprising:
   a superconducting transmission line having a biased D.C. current, a length L and an impedance Z;
   a photon emitter emitting a single photon having energy E for hitting said superconducting transmission line at location d from the center of said transmission line causing two voltage pulses to propagate along said superconducting transmission line in different directions with speed v;
   a read-out circuit coupled to said superconducting transmission line for measuring the arrival times t1 and t2, respectively, of said two voltage pulses and for measuring a plurality of pulse properties of said two voltage pulses; and
   a computer coupled to an output of said read-out circuit for calculating with said computer a photon arrival time t0 and said photon location.

15. The system of claim 14, wherein said photon arrival time t0 and said photon location d are calculated using the formulae, $t0=(t1+t2-L/v)/2$, $d=v*(t1-t2)/2$.

16. The system of claim 14, wherein said superconducting transmission line is meander shaped.

17. The system of claim 16, wherein said meander shaped superconducting transmission line is divided into a plurality of pixels.

18. The system of claim 17, wherein said plurality of pixels include spiral shaped pixels.

19. The system of claim 14, further comprising a plurality of calibration curves for calculating said photon energy E from said pulse properties.

20. The system of claim 17, wherein said computer determines the maximum number of pixels Np, $Np=La/Lp$ where La is the maximum distance a pulse can travel and Lp is the length of said superconducting transmission line within one pixel.

21. The system of claim 14, further comprising an on-chip integrated read-out circuit implementing Rapid Single Flux Quantum logic.

22. The system of claim 14, wherein said superconducting transmission line includes a double meander shaped transmission line having a primary meander structure that defines columns of a first plurality of pixels and a secondary meander structure that defines rows of a second plurality of pixels.

23. The system of claim 14, wherein said superconducting transmission line includes a microstrip transmission line having a superconducting ground plane.

24. The system of claim 14, wherein said superconducting transmission line includes a coplanar waveguide transmission line.

25. The system of claim 14, wherein said superconducting transmission line comprises a plurality of superconductive strips over a superconducting ground plane to form two microstrip transmission lines arranged in a checkerboard fashion.

26. A system for providing spatial, temporal, energy-resolving detection of single photons comprising:

means for biasing D.C. current I in a superconducting transmission line having a length L and an impedance Z;

means for coupling said superconducting transmission line to a read-out circuit;

means for coupling an output of said read-out circuit to a computer;

means for hitting said superconducting transmission line at location d from the center of said transmission line with a single photon having energy E causing two voltage pulses to propagate along said superconducting transmission line in different directions with speed v;

means for measuring the arrival times t1 and t2, respectively, of said two voltage pulses; and means for calculating with said computer a photon arrival time t0 and said photon location d.

* * * * *